United States Patent [19]

Cocks et al.

[11] Patent Number: 5,298,340
[45] Date of Patent: Mar. 29, 1994

[54] CARBON-ION ON FUEL CELL FOR THE FLAMELESS COMBUSTION OF COAL

[76] Inventors: Franklin H. Cocks, 5 Learned Pl.; Henry LaViers, 209 Alexander Ave., Apartment D, both of Durham, N.C. 27705

[21] Appl. No.: 925,506
[22] Filed: Aug. 5, 1992
[51] Int. Cl.⁵ .............................................. H01M 8/12
[52] U.S. Cl. ........................................ 429/13; 429/33; 429/102
[58] Field of Search .................... 429/13, 17, 19, 20, 429/30, 33, 16, 101, 102, 105, 107, 191; 252/62.2; 204/421

[56] References Cited

U.S. PATENT DOCUMENTS

| | | | |
|---|---|---|---|
| 460,122 | 9/1891 | Edison | 429/17 |
| 3,980,543 | 9/1976 | Eckfeldt | 204/195 |
| 4,598,028 | 7/1986 | Rossing et al. | 429/30 |
| 4,644,751 | 2/1987 | Hsu | 60/676 |
| 4,826,740 | 5/1989 | Costa | 429/17 |
| 4,921,765 | 5/1990 | Gmeindl | 429/16 |

Primary Examiner—Anthony Skapars

[57] ABSTRACT

Carbon-ion electrolytes, combined into a fuel cell containing an electrode of liquid metal into which carbon or coal has been dissolved, can be used for producing electric power by the flameless combustion of coal via an electrochemical process. The resulting device is an electrochemical cell consisting of a cathodic electrode in contact with oxygen, an anodic electrode of liquid metal solvent containing dissolved carbon, and a carbon-ion electrolyte separating the anode and cathode electrodes.

5 Claims, 1 Drawing Sheet

CARBON-ION ON FUEL CELL FOR THE FLAMELESS COMBUSTION OF COAL

BACKGROUND OF THE INVENTION

This invention relates to electrochemical cells made possible by a carbon-ion electrolyte. Additionally, an improved process for producing electric power is disclosed. Preferred use of the invention is set forth in producing electric power, with fuel for the process being the utilization of carbon dissolved in a liquid solvent, preferably liquid iron.

SUMMARY OF THE PRIOR ART

Sir Humphrey Davy first demonstrated the production of electrical power from a crude fuel cell in 1802. Davy's work was expanded upon by Sir William Grove in 1839. Grove's fuel cell used hydrogen gas as the fuel and oxygen from air as the oxident. The electrolyte was a weak acid, which conducted hydrogen ions. Dr. W. W. Jacques, in 1896 demonstrated a 1.50 kilowatt fuel cell that he believed to be due to a coal and oxygen reaction, with a molten caustic electrolyte conducting oxygen-ions, although later investigators determined that his was actually a hydrogen/oxygen cell running on an unrecognised electrolyte/anode reaction inside the cell. Jacques work was reported in Harper's Magazine volume 94 on page 14 in 1896. From 1915–1920, Baur studied a carbon/oxygen fuel cell that was unsuccessful due to corrosion problems. Details of his results are given in Z. Elektrochem. volume 27 on page 199 in 1921.

Commercially viable fuel cell technology has progressed from studies by the engineer Francis T. Bacon at Cambridge University in England during the period 1920–1960 to space applications in the USA from 1960–1975 to small utility scale demonstration plants around the globe in the decade of the 1990's. A summary of this progression is given on pages 7–14 of A. J. Appleby and F. R. Foulkes' *Fuel Cell Handbook* published by Van Nostrand Reinhold in 1989. With today's technology, four classes of cells predominate: hydrogen ion electrolyte cells, phosphoric acid electrolyte cells, molten carbonate electrolyte cells, and solid-oxide electrolyte cells. Hydrogen ion cells have advanced to the point that they are the best power technology for many space applications. All four cell types use gaseous fuels: hydrogen, CO or $CH_4$.

SUMMARY OF THE INVENTION

This invention discloses an entirely new class of fuel cell using an electrolyte that transports carbon-ions. This new class of cells involves the dissolution of carbon into a solvent, which is preferably a molten metal. Four such molten metal solvents are iron, gallium, mercury, and lithium. The solvent acts as an anode by converting the carbon to an ionized state to produce carbon-ions and electrons. The current of these electrons from the anode through the wires of a power-generation electric circuit to the cathode enables them to react at the cathode with oxygen to produce oxygen-ions. Matching this current of electrons is the diffusion of carbon-ions through the carbon-ion electrolyte to the cathode where the carbon-ions react with the oxygen-ions to produce oxidized carbon.

Thermodynamic factors favor a solid carbon fuel cell over other fuel cell designs. A combination of enthalpy and Gibbs Free Energy values makes the reaction of solid carbon and oxygen one of high efficiency. The entropy change in the reaction allows this efficiency to remain essentially constant at high temperatures. High temperature operation allows the use of new and wider ranges of electrolytes and the high temperature of the exhaust gas has more work potential for further recovery in a bottoming cycle.

OTHER OBJECTS AND ADVANTAGES OF THE INVENTION

It is an object of the invention to provide a new source of electricity from coal combustion, without the need for flames or burning.

It is another object of the invention to increase the efficiency with which coal can be used to produce electric power.

It is yet another object of the invention to mitigate the potential for global warming from coal combustion by reducing the atmospheric emissions produced for each unit of electricity produced from coal combustion.

It is still another object of the invention to provide a means of generating electric power from carbon derived from a coal contaminated with sulfur impurities, without releasing sulfur dioxide into the atmosphere, by reacting this sulfur with a slag contained in the reservoir of metal into which the carbon derived from the coal is dissolved.

The economic consequences of a solid carbon fuel cell are extremely valuable, particularly in the USA with its large reserves of coal. The production from coal, of carbon in the form of coke to fuel the new type of cell yields two low cost byproducts of significant economic importance: oils to be used as transportation fuels, and gases suitable for other types of fuel cells, turbines or engines.

It is yet another object of the invention to produce direct current electric power without the need for rectification. Direct current producing carbon-ion fuel cells also permit other advances. Series connected carbon fuel cell units will be inherently maintainable, since individual cells can be taken off-line without altering total power production by more than a few percent, unlike power plants that involve megawatt sized units. By producing DC current of high voltage by series connecting many carbon fuel cell subsystems, long distance transmission of electricity can be made less costly. Direct current transmission lines have less parasitic energy losses from inductive and capacitive coupling than AC lines, and in addition utilize the entire cross-section of the line for the passage of the current. In contrast, alternating currents exhibit a "skin effect" whereby the current is preferentially carried near and on the surface of the transmission wire. Cheaper long distance DC transmission systems can promote the construction of "mine-mouth" power plants. Railroad freight charges typically account for 25–35% of the cost to utilities of coal from the eastern USA coalfields, but in the case of coal from the western USA coalfields may be as much as 70% of the delivered cost of the coal. Direct current electricity may also be of importance to industries such as aluminum, where it is mandatory for the process and electrical cost is the largest component in the total cost of the product and for which direct current electrical power is required.

Finally, in the future the choice of DC versus AC may be dictated by health risks, as extensive research is going on between links of cancer and electromagnetic radiation from AC power lines.

The molten iron in the reservoir contains dissolved carbon. The carbon dissolved in the iron serves as the fuel supply of the fuel cell. The liquid iron is also an electronic conductor and acts as the anode of the fuel cell. Two electrical contacts, one contact (11) touching the cathodes at the tube manifold, and one contact (12) touching the molten iron anode in the reservoir, are connected through electrical wiring (13) to a power generating circuit (14). The atmosphere surrounding the feeder and above the molten iron reservoir is one of carbon dioxide gas to prevent oxidation of the hot iron or carbon.

Figure 1:
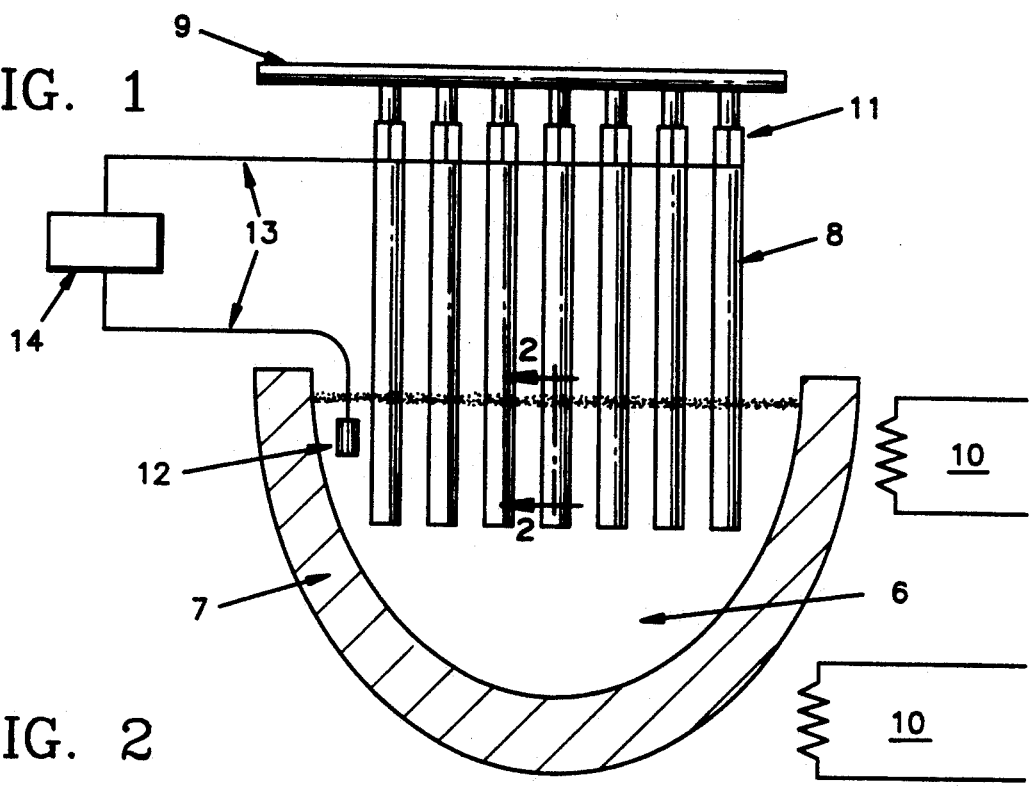
FIG. 1 is a cross-sectional view of an apparatus for producing electric power using a carbon-ion fuel cell. Numbers in parenthesis refer to the numbers designating the parts of the apparatus as depicted in the drawings. The apparatus consists of: a reservoir (7) containing molten iron (6) and a multitude of tubes (8) immersed in the molten iron of the reservoir. An oxygen containing mixture of gases is pumped through the inside of the tubes by means of a manifold (9). The liquid iron is induced to flow around the tube structures in currents created by thermal convection. These convective currents are continuously maintained by a temperature gradient induced by differential heating of the reservoir of liquid iron by heaters (10).
Figure 2:
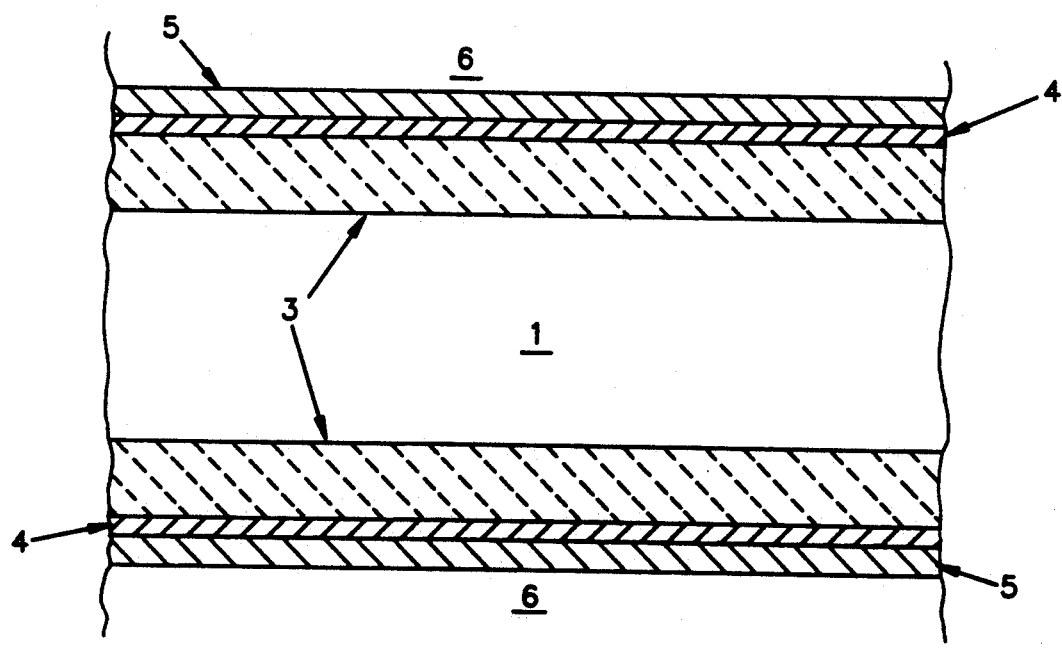

FIG. 2 is a cross-section of a tube through section 2—2 of FIG. 1. The walls of the tubes are made preferably of three layers of material. The first layer (3) is a refractory support structure porous to oxygen gas that gives the entire assembly strength and temperature stability. The second layer is the cathode of the fuel cell consists of a porous metal coating (4) deposited on the outside surface of the refractory tube. The third and outermost layer (5) is a thin layer of carbon-ion electrolyte material. Surrounding and in direct contact with the outside surface of the third layer of the tube wall is the liquid iron (6).

PHYSICS OF THE METHOD

It has long been recognized that fuel cells have thermodynamic advantages over the power plants now in use. What is not widely recognized is that fuel cells are also limited by specific thermodynamic factors of their own. The theoretical efficiency of a fuel cell is limited in a manner different from heat engines that use cycles of pressure/volume/temperature similar to the Carnot cycle. The differences between fuel cell and Carnot cycle efficiency are important to note for economic evaluation of the present invention.

The Carnot maximum permitted efficiency equation is $(T_2-T_1)/T_2$, where $T_1$ is the low temperature reservoir (usually air or water outside the plant) into which the plant exhausts waste heat, and $T_2$ the high temperature reservoir (usually steam heated by the furnace) from which the turbine obtains energy. In a modern power plant $T_1$ is typically near 375 Kelvin and $T_2$ is typically near 1375 Kelvin. The maximum theoretical efficiency is therefore about 72%. In reality, heat losses and waste in the coal fired plant's machinery reduce this maximum permitted efficiency to an actual efficiency of approximately 40–50% in today's best designs. Most existing plants have efficiencies of 30–35%.

The theoretical maximum efficiency of the chemical to electrical energy conversion that occurs within a fuel cell is given by $\Delta G/\Delta H$, where $\Delta G$ is the change in Gibbs Free Energy due to the chemical reaction in the cell and $\Delta H$ is the change in enthalpy due to the chemical reaction in the cell. Table 1 from A. J. Appleby and F. R. Foulkes in *Fuel Cell Handbook* published by Van Nostrand Reinhold in 1989 on page 18 is a compilation of chemical reactions listing the appropriate values for Standard Conditions of 298 degrees Kelvin and one atmosphere of pressure, plus the maximum efficiencies at 298, 600 and 1000K.

TABLE 1

| Reaction | Fuel Cell Thermodynamic Values and Maximum Permitted Efficiencies | | | | |
|---|---|---|---|---|---|
| | $\Delta$ H298 | $\Delta$ G298 | % E298 | % E600 | % E1000 |
| $H2 + \tfrac{1}{2} O2 = H2O$ (l) | 286.0 | 237.3 | 82.97 | — | — |
| $H2 + \tfrac{1}{2} O2 = H2O$ (g) | 253 | 237.3 | 94.01 | 87.93 | 79.90 |
| $CO + \tfrac{1}{2} O2 = CO2$ (g) | 283.1 | 257.2 | 90.86 | 81.60 | 69.33 |
| $C + O2 = CO2$ (g) | 393.7 | 394.6 | +99.5 | +99.6 | +99.7 |

Mathematically, the relationship between entropy, enthalpy, absolute temperature and thermodynamic efficiency can be expressed as follows:

Maximum Efficiency = $[\Delta G/\Delta H] \times 100\%$
$\Delta G = \Delta H - T\Delta S$ where $\Delta S$ is the change in entropy and $T$ is Temperature in Kelvin
Maximum Efficiency = $(\Delta H - T\Delta S)/\Delta H \times 100\%$
$= [1 - (T\Delta S/\Delta H)] \times 100\%$ Hence the efficiency of a given fuel cell reaction is determined by the value of the number $T\Delta S/\Delta H$. It is illuminating to consider the factors that determine whether $T\Delta S/\Delta H$ is a positive or negative number. For the reaction of solid carbon with oxygen, the value of the product of $T\Delta S/\Delta H$ is a small negative number. The three values of T, $\Delta S$ and $\Delta H$ contribute to this result as follows: T, the absolute temperature, is always positive. $\Delta H$, the change in enthalpy, is negative for the oxidation of carbon. $\Delta S$, the change in entropy, is positive but small, because the reaction involves a mole of low entropy solid and a mole of high entropy gas combining to become one mole of high entropy gas. At 298K the value of $T\Delta S/\Delta H$ for the oxidation of carbon is equal to negative 0.0022. according to values given by A. J. Appleby and F. R. Foulkes in *Fuel Cell Handbook* published by Van Nostrand Reinhold in 1989. At a temperature of 1500 C., the maximum efficiency of the reaction of carbon and oxygen is nearly the theoretical 100%.

In contrast, for the reaction of either carbon monoxide or hydrogen with oxygen, the value of $T\Delta S/\Delta H$ is a positive number. This is because for these two reactions $\Delta S$ is a negative number. Both reactions involve two moles of gases combining to become one mole of gas. At 298K the value of $T\Delta S/\Delta H$ for the oxidation of carbon monoxide is equal to positive 0.091, a value forty-one times larger than that of the oxidation of solid carbon and of opposite sign, according to Appleby and Foulkes as cited above.

This means that the solid carbon reaction increases very slightly in efficiency with an increase in temperature. In the other two reactions efficiency decreases at a significant rate with an increase in temperature. Therefore, the electrochemical oxidation of solid carbon has a theoretical efficiency advantage over the oxidation of either hydrogen or carbon monoxide of approximately 12-31% at realistic operating temperatures.

The above maximum efficiency numbers are not, of course, achieved in actual operating cells using today's technology. For example, some hydrogen/oxygen cells in the space program have achieved efficiencies near 60%, versus their maximum of 94% as shown in the previous table. Present designs for a hydrogen+carbon monoxide/oxygen cell using a molten carbonate electrolyte hope to achieve 48% efficiency for a plant layout that will include a bottoming cycle. Details of this state of the art design are given by D. K. Fleming and K. A. Atabay in Modern Power Systems Magazine in August, 1990, volume 10, number 8, pages 25-28.

A related problem in cells with gaseous fuels is that not all of the gas reacts as it passes through the fuel cell. In theory this unused fuel can be re-concentrated and recycled into the cell again, but in practice this is found to be uneconomic and any unreacted gas is burned. In a carbon fuel cell the carbon will be dissolved in solvent of liquid iron that also acts as the anode of the cell by converting part of the carbon to an ionized state to produce carbon ions and electrons. With stirring and control of the carbon concentration, this unique use of a anode/solvent to hold the fuel has the potential to react nearly 100% of the carbon fed to the cell. This will be a major advantage of molten iron anodes in carbon-ion cells over gaseous cells.

As shown above, the carbon oxidation reaction is less sensitive to increases in temperature. As the ionic conductivity of electrolytes generally increase exponentially with temperature, a benefit of this temperature tolerance has been to increase the number and types of materials having useable values of ionic carbon conductivity.

A further theoretical point concerning carbon is that at a ionic valence of $-4$, it has a charge carrying advantage over oxygen whose ionic valence is $-2$. When passing through a electrolyte, only ½ the number of $-4$ carbon-ions need to diffuse across the electrolyte to carry the same current as do $-2$ oxygen-ions. Similarly, compared to carbon monoxide or hydrogen ions, only ¼ the number of carbon ions need to cross the electrolyte as do ions that have a valence of $+$ or $-1$. Carbon ion electrolytes do not have to diffuse the same number of ions to maintain the same electrical current as present electrolyte materials in commercial fuel cells.

The critical element in this invention is electrolytes in which carbon-ions are mobile. In previous electrolyte developments, new electrolytes were discovered by searching for chemical compounds that had the same atomic crystal lattice structure as those of already known electrolytes.

For example, $ZrO_2$, the main electrolyte in today's commercial solid oxide fuel cells, has the same crystal structure prototype at high temperatures as the compound "Fluorite" ($CaF_2$), a known electrolyte for $F^-$ ions. $ZrO_2$ can be stabilized so as to hold this fluorite "model" or "prototype" of crystal structure at ambient temperatures by the process of controlled contamination with another element termed "doping". $ZrO_2$ is normally doped with CaO, where CaO has the prototype NaCl crystal structure. Proper doping not only stabilizes the crystal structure but also can greatly increase the ionic conductivity by introducing vacancies in the oxygen ion lattice. According to Dr. W. D. Kingery on page 135 in *Introduction to Ceramics*, John Wiley and Sons, New York 1976, "additions of CaO to $ZrO_2$ form a solid solution with the cubic fluorite structure in which $Ca^{2+}$ are substituted for $Zr^{4+}$. Each time this is done, an oxygen-ion site is left vacant to maintain the cation-anion site relationship of 1:2. Similarly, additions of $La_2O_3$ to $CeO_2$ or $ZrO_2$ and CdO with $Bi_2O_3$ give rise to substantial numbers of vacant sites in the anion array." Properly doped $ZrO_2$ conducts oxygen ions so well that it has been termed a "superionic" conductor.

However, the use of Zirconium can not be immediately transferred to carbides. ZrC does not have the fluorite crystal structure prototype. ZrC has the NaCl crystal structure prototype similar to CaO.

Electronic conduction is a critical issue in successful fuel cell operation. Electronic conduction would "short circuit" the electrical system of a fuel cell by allowing electrons to bypass the wires from anode to cathode in which a fuel cell generates power in an external load. These short circuited electrons would dissipate their potential electrical energy by heating up the electrolyte according to the power version of Ohm's law: Power$=I^2/R$, where I is the current due to the short circuited electrons and R is the ohmic resistance of the electrolyte. Some carbides do have low electronic conductivity. $CaC_2$ has a conductivity of 0.0017 ohm$^{-1}$ centimeter$^{-1}$.

Chemically, the fluorite structure prototype has the formula $RX_2$ where R is a cation and X is an anion and the ionic radii of R is greater than 0.73 times that of X. Table 2 lists known carbides that have the fluorite crystal prototype structure at elevated temperature. Here the beta form of crystal structure is the Fluorite structure.

TABLE 2

LANTHANIDE CARBIDES WITH THE FLUORITE PROTOTYPE CRYSTAL STRUCTURE

| COMPOUND | TRANSFORMATION TEMPERATURE |
|---|---|
| $EuC_2$ | 350 |
| $CeC_2$ | 1050 |
| $LaC_2$ | 1060 |
| $NdC_2$ | 1150 |
| $SmC_2$ | 1170 |
| $GdC_2$ | 1240 |
| $TbC_2$ | 1288 |
| $HoC_2$ | 1300 |
| $ErC_2$ | 1310 |
| $YC_2$ | 1324 |
| $TmC_2$ | 1355 |
| $LuC_2$ | 1450 |

TABLE 3

DOPANTS WITH THE NaCL PROTOTYPE CRYSTAL STRUCTURE

| | | | | | | | |
|---|---|---|---|---|---|---|---|
| $CaC_2$ | CeN | TiN | AmO | TiO | YSb | LaSb | SmTe |
| HfC | CrN | TmN | BaO | UO | YTe | LaSe | TbAs |
| MoC | DyN | UN | CaO | VO | GdAs | LaTe | TbBi |
| NbC | ErN | VN | CdO | YbO | GdSb | NdAs | TbP |
| NpC | EuN | YN | CoO | CeAs | GdSe | NdBi | TbS |
| PdC | GdN | YbN | EuO | CeBi | HoAs | NdP | TbSb |
| PuC | HoN | ZrN | FeO | CeP | HoBi | NdS | TbSe |
| ReC | LaN | | MgO | CeS | HoP | NdSb | TbTe |
| TaC | LuN | | MnO | CeSb | HoS | NdSe | TmAs |

TABLE 3-continued
DOPANTS WITH THE NaCL PROTOTYPE CRYSTAL STRUCTURE

| TcC | NbN | NbO | CeTe | HoSb | NdTe | TmSb |
|---|---|---|---|---|---|---|
| ThC | NdN | NiO | ErAs | HoSe | SmAs | TmTe |
| TiC | NpN | NpO | ErSb | HoTe | SmBi | YAs |
| UC | PrN | SmO | ErTe | LaAs | SmP | |
| VC | ScN | SrO | EuS | LaBi | SmS | |
| WC | SmN | TaO | EuSe | LaP | SmSb | |
| ZrC | TbN | ZrO | EuTe | LaS | SmSe | |

In a manner analogous to proper doping of $ZrO_2$ to create an electrolyte for oxygen-ions, an electrolyte for carbon-ions can be created with a fluorite crystal structure. The carbon-ion electrolyte's crystal structure must be stabilized so as to continue to exist in the fluorite form over a temperature range from ambient to that of the fuel cell's highest operating temperature. The carbon-ion electrolyte's crystal lattice will have many anion vacancies made by combining a carbide with the Fluorite crystal structure from Table 1 with a compound with the NaCl crystal structure from Table 2. The cation in the NaCl structure compound should be of a lower valence than the cation in the lanthanide carbide in order to create vacancies in the anion lattice of the lanthanide carbide. These vacancies in the anion lattice increase the ionic carbon conductivity. It is found that this requires that the lanthanide carbides be doped with at least 0.001 weight percent of at least one element which is not carbon or a lanthanide, such as Ca, Zr, Hf, Be, Mn, or Al.

It will be recognized that the invention disclosed here is not limited to the precise compounds disclosed but will include other carbon-ion conducting compounds as well.

A second category of crystal structures that are carbon-ion electrolytes are those with a disordered layered structure. These layered carbon structures will be analogous to sodium layers in beta alumina. Beta alumina is a known ionic conductor of $Na^+$ ions. Al, Be, and Mn carbides, such as $Al_4C_3$, $Be_2C$ and MnC, have this disordered layer structure with carbon vacancies in the atomic lattice structure. These three carbides are unique in that they are the carbide "methanides" (meaning that they give methane upon reaction with water) and have singly bonded carbon to carbon bonds.

DESCRIPTION OF THE PREFERRED EMBODIMENTS

One preferred solid carbon-ion electrolyte used in the invention is the compound $Eu_{1-x}Zr_xC_{2-x}$, a combination of the compounds $EuC_2$ and $ZrC_2$. $EuC_2$ alone has the body centered tetragonal crystal structure of the $CaC_2$ prototype at room temperature and converts to the Fluorite crystal structure prototype at about 350 degrees centigrade. $ZrC_2$ is a dopant of the NaCl crystal structure prototype and is added to $EuC_2$ to perform the dual role of stabilizing the Fluorite crystal lattice structure prototype over the operating temperature range of the fuel cell and also of creating a multitude of anion vacancies beneficial to carbon-ion conduction. In this compound x preferably lies within the range 0.03 to 0.35. A gas porous refractory tube that is permeable to oxygen is used for structural support. On the outer surface of this tube is then deposited a thin and gas porous layer of a noble metal. Next, the combined carbon-ion electrolyte compound $Eu_{1-x}Zr_xC_{2-x}$ is deposited onto the outer surface of the gas-porous noble metal.

The porous noble metal coating, which is permeable to oxygen gas and is electronically conductive, is the cathode of the cell and provides a low resistance electrical contact for connection to the electrical wiring by which means electrical power is extracted. The outside surfaces of the $Eu_{1-x}Zr_xC_{2-x}$ layer is in contact with the liquid metal into which carbon has been dissolved to serve as fuel for the cell. The liquid metal is the anode of the cell. Immersed in the liquid metal of the reservoir are electric contacts of a material resistant to the corrosive effects of the molten metal solvent. Connected to these contacts is a power generating circuit terminating at the cathode surfaces.

The liquid metal is stirred by convective forces caused by a temperature difference from the top of the reservoir to the bottom. In operation, the carbon which is dissolved in the liquid metal solvent, passes by diffusion while in an ionized state through the carbon-ion electrolyte and reaches the noble metal layer disposed at the carbon-ion electrolyte/oxygen interface, where combination with oxygen occurs together with the transfer of electrons from the carbon to the oxygen. In this way the noble metal layer acts as the cathode in the cell whereas the liquid metal containing the carbon acts as the anode. By electrically connecting the anode and the cathode, through a load, electrical power may thus be produced.

In a second preferred embodiment the preferred solid carbon-ion electrolyte is the compound $Eu_{1-x}Zr_xN_xC_{2-2x}$, a combination of the compounds $EuC_2$ and ZrN. $EuC_2$ alone has the body centered tetragonal crystal structure of the $CaC_2$ prototype at room temperature and converts to the Fluorite crystal structure prototype at about 350 degrees centigrade. ZrN is a dopant of the NaCl crystal lattice structure prototype and is added to $EuC_2$ to perform the dual role of stabilizing the Fluorite crystal lattice structure prototype over the operating temperature range of the fuel cell and also of creating a multitude of anion vacancies beneficial to carbon-ion conduction in the compound. In this compound x preferably lies within the range 0.01 to 0.45.

Gas-porous alumina refractory tubes that are permeable to oxygen are used for structural support of the carbon-ion membrane compound material. On the outer surface of the tubes are then deposited a gas-porous, thin layer of a noble metal, preferably platinum. Next, the combined carbon-ion electrolyte compound $Eu_{1-x}Zr_xN_xC_{2-2x}$ is deposited by sputtering it onto the gas-porous platinum-coated outer surfaces of the gas-porous refractory alumina tubes. The cathode of the cell is the porous noble metal coating, which is permeable to oxygen gas and is electronically conductive to provide a low resistance electrical contact. The outside surfaces of the $Eu_{1-x}Zr_xN_xC_{2-2x}$ layer is in contact with the liquid iron that serves as the anode of the fuel cell and into which carbon has been dissolved to serve as fuel for the cell. Other metals that have some solubility for carbon, such as lithium, may also be used, but lithium is highly combustible. Immersed in the liquid metal of the reservoir are electric contacts of a material resistant to the corrosive effects of the molten metal solvent, such as clay-stabilized graphite. Connected to these contacts is a power generation circuit terminating at the platinum coating at the cathode surfaces. The liquid metal is stirred by convective forces caused by a temperature difference from the top of the reservoir to the bottom or by mechanical means.

In operation, the carbon which is dissolved in the liquid metal solvent, is first effectively purified of sulfur through the use of well-known sulfur reducing slags, such as those that contain manganese dioxide. However, even if the sulfur were not removed in the slag, it would still not be oxidized within the fuel cell due to the inability of the carbon-ion electrolyte to pass sulfur ions. The carbon-ions pass by diffusion in an ionized state through the carbon-ion electrolyte and reach the noble metal layer disposed at the carbon-ion electrolyte/oxygen interface, where combination with oxygen-ions occurs together with the transfer of electrons via an external electrical circuit.

In this way the noble metal layer acts as the cathode in the cell whereas the liquid metal containing the carbon acts as the anode. Although not all of the carbon atoms in the dissolved melt are ionized, as the ionized carbon passes by diffusion through the electrolyte, fresh ions are formed so that the electrical balance in the overall electrochemical reaction is preserved. Electrical power is obtained from this carbon fuel cell by connecting the anode and the cathode via wires through an electrical load.

In a third preferred embodiment the preferred solid carbon-ion electrolyte is the compound $(EuC_2)_{1-x}(EuN)_x$, a combination of the compounds $EuC_2$ and $EuN$. $EuC_2$ alone has the body centered tetragonal crystal structure of the $CaC_2$ prototype at room temperature and converts to the Fluorite crystal structure prototype at about 350 degrees centigrade. $EuN$ is a dopant of the NaCl crystal lattice structure prototype and is added to $EuC_2$ to perform the three part role of: (1) stabilizing the fluorite crystal lattice structure over the operating temperature range of the fuel cell, (2) creating a multitude of anion vacancies beneficial to carbon-ion conduction in the compound, and (3) decreasing the electronic conductivity of the resulting superionic conductor material. In this compound x preferably lies within the range 0.01 to 0.45.

We claim:

1. An improved process for the flameless combustion of carbon to produce electric power in which carbon is dissolved into a molten metal, said molten metal acting as an anode by converting part of said carbon to an ionized state to produce carbon-ions and electrons, the passage of a current of said electrons through a power generating circuit to a cathode where said electrons react with oxygen to produce oxygen-ions, and wherein the improvement comprises the diffusion of said carbon-ions through a carbon-ion electrolyte to said cathode, where said carbon-ions react with said oxygen-ions to produce oxidized carbon.

2. The improved process of claim 1 in which said carbon-ion electrolyte is selected from the group of carbon-ion electrolytes consisting of $CeC_2$, $LaC_2$, $NdC_2$, $SmC_2$, $GdC_2$, $TbC_2$, $HoC_2$, $ErC_2$, $EuC_2$, $TmC_2$, $LuC_2$, and $CaC_2$.

3. The improved process of claim 1 in which said carbon-ion electrolyte is selected from the group of carbon-ion electrolytes consisting of $Al_4C_3$, $Be_2C$, and $MnC$.

4. The improved process of claim 1 in which said carbon-ion electrolyte has a fluoride prototype crystal structure.

5. The improved process of claim 4 in which said carbon-ion electrolyte is stabilized to have a fluorite structure by the addition of a compound with a sodium chloride prototype crystal structure.

* * * * *